(12) United States Patent
Lilly

(10) Patent No.: US 10,134,388 B1
(45) Date of Patent: Nov. 20, 2018

(54) WORD GENERATION FOR SPEECH RECOGNITION

(71) Applicant: Amazon Technologies, Inc., Seattle, WA (US)

(72) Inventor: Jeffrey Paul Lilly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 14/757,680

(22) Filed: Dec. 23, 2015

(51) Int. Cl.
*G10L 15/06* (2013.01)
*G10L 15/18* (2013.01)
*G10L 15/30* (2013.01)
*G10L 15/22* (2006.01)
*G10L 15/08* (2006.01)

(52) U.S. Cl.
CPC ........ *G10L 15/063* (2013.01); *G10L 15/1815* (2013.01); *G10L 15/22* (2013.01); *G10L 15/30* (2013.01); *G10L 2015/0636* (2013.01); *G10L 2015/088* (2013.01); *G10L 2015/223* (2013.01)

(58) Field of Classification Search
CPC ..................................................... G10L 15/063
USPC ......................................................... 704/238
See application file for complete search history.

(56) References Cited

U.S. PATENT DOCUMENTS

| | | | | |
|---|---|---|---|---|
| 5,619,709 A * | 4/1997 | Caid | ................. | G06F 17/30265 704/9 |
| 6,334,102 B1 * | 12/2001 | Lewis | ................... | G10L 15/197 704/255 |
| 6,347,295 B1 * | 2/2002 | Vitale | ..................... | G10L 13/08 704/209 |
| 6,430,557 B1 * | 8/2002 | Gaussier | ........... | G06F 17/30672 |
| 6,928,404 B1 * | 8/2005 | Gopalakrishnan | ...... | G06F 17/27 704/1 |
| 7,120,582 B1 * | 10/2006 | Young | .................. | G10L 15/063 704/255 |
| 2001/0012999 A1 * | 8/2001 | Vitale | ..................... | G10L 13/08 704/260 |
| 2003/0233235 A1 * | 12/2003 | Park | ...................... | G06F 17/278 704/257 |
| 2006/0004744 A1 * | 1/2006 | Nevidomski | ..... | G06F 17/30985 |
| 2007/0162281 A1 * | 7/2007 | Saitoh | .................. | G10L 15/197 704/251 |

(Continued)

OTHER PUBLICATIONS

Pennington, at al. GloVe: Global Vectors for Word Representation. Stanford University Natural Language Processing Group. Downloaded from http:/nlp.stanford.edu/projects/glove/ on Nov. 5, 2015.

(Continued)

*Primary Examiner* — Paras D Shah
*Assistant Examiner* — Oluwadamilola M Ogunbiyi
(74) *Attorney, Agent, or Firm* — Pierce Atwood LLP

(57) ABSTRACT

An automatic speech recognition (ASR) system may add new words to an ASR system by identifying words with similar usage and replicating the variations of the identified words to create new words. A new word that is used similarly to a known word may be varied to create new word forms that are similar to the word forms of a known word. The new word forms may then be incorporated into an ASR model to allow the ASR system to recognize those words when they are detected in speech. Such a system may allow flexible incorporation and recognition of varied forms of new words entering a general lexicon.

20 Claims, 10 Drawing Sheets

(56) References Cited

U.S. PATENT DOCUMENTS

| | | | | |
|---|---|---|---|---|
| 2008/0183685 A1* | 7/2008 | He | ............... | G06F 17/30528 |
| 2008/0275837 A1* | 11/2008 | Lambov | ............ | G06F 17/30985 |
| | | | | 706/48 |
| 2009/0150153 A1* | 6/2009 | Li | ............... | G10L 13/08 |
| | | | | 704/254 |
| 2009/0216911 A1* | 8/2009 | Long | ............... | G06F 17/276 |
| | | | | 710/2 |
| 2010/0030645 A1* | 2/2010 | Watanuki | ......... | G06F 17/30781 |
| | | | | 705/14.53 |
| 2013/0297309 A1* | 11/2013 | Reding | ............ | G10L 15/30 |
| | | | | 704/235 |
| 2016/0034571 A1* | 2/2016 | Setayesh | ............ | G06F 17/2785 |
| | | | | 707/738 |
| 2016/0062979 A1* | 3/2016 | Mote | ............... | G06F 17/27 |
| | | | | 704/9 |
| 2016/0125874 A1* | 5/2016 | Yong | ............... | G10L 15/08 |
| | | | | 704/251 |

OTHER PUBLICATIONS

Pennington, at al. GloVe: Global Vectors for Word Representation. Conference on Empirical Methods in Natural Language Processing. vol. 14. 2014.

\* cited by examiner

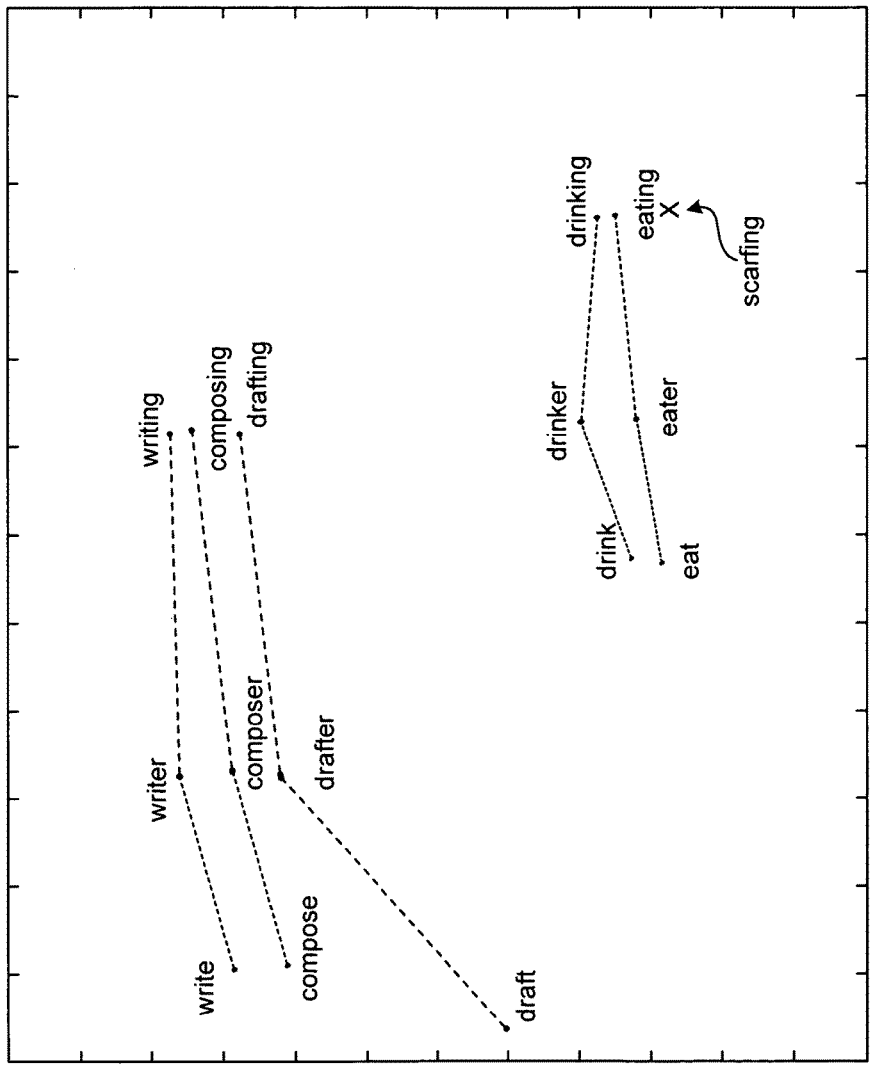

WORD GENERATION FOR SPEECH RECOGNITION

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A-4C illustrate representations of word usage similarity in a vector space.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. A typical such distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

In order to make a speech command system more robust and useful, the system may use ASR models that are trained to recognize a wide variety of words. Or the system may use ASR models that are trained for a particular domain (music, banking, etc.). In order for an ASR system to recognize a particular word, the ASR model used during ASR processing is configured to recognize the word. That is, the model is configured to recognize the sounds corresponding to the word and to determine a likelihood that those sounds together are intended to be the word in question. This process is described in more detail below. As can be appreciated, an ASR model should be trained to recognize a word to avoid errors when processing audio including that word.

Keeping an ASR model trained on all possible words is not necessarily a simple task. Spoken language (either in English or in any other language) is continually evolving, with new words and new word forms regularly entering the spoken language. Such new words may include words never encountered before (such as slang or made-up words), new variations of existing words (including different plurals, gerund, adjective or other new variations of existing words), or the like. While new ASR models may be trained once new words are encountered, it is desirable to have a flexible, machine operated system, that can not only incorporate new words for inclusion in an ASR model, but also can anticipate potential variations of new words and train an ASR model to recognize such potential variations, even if those potential variations have not yet been encountered.

Figure 1:
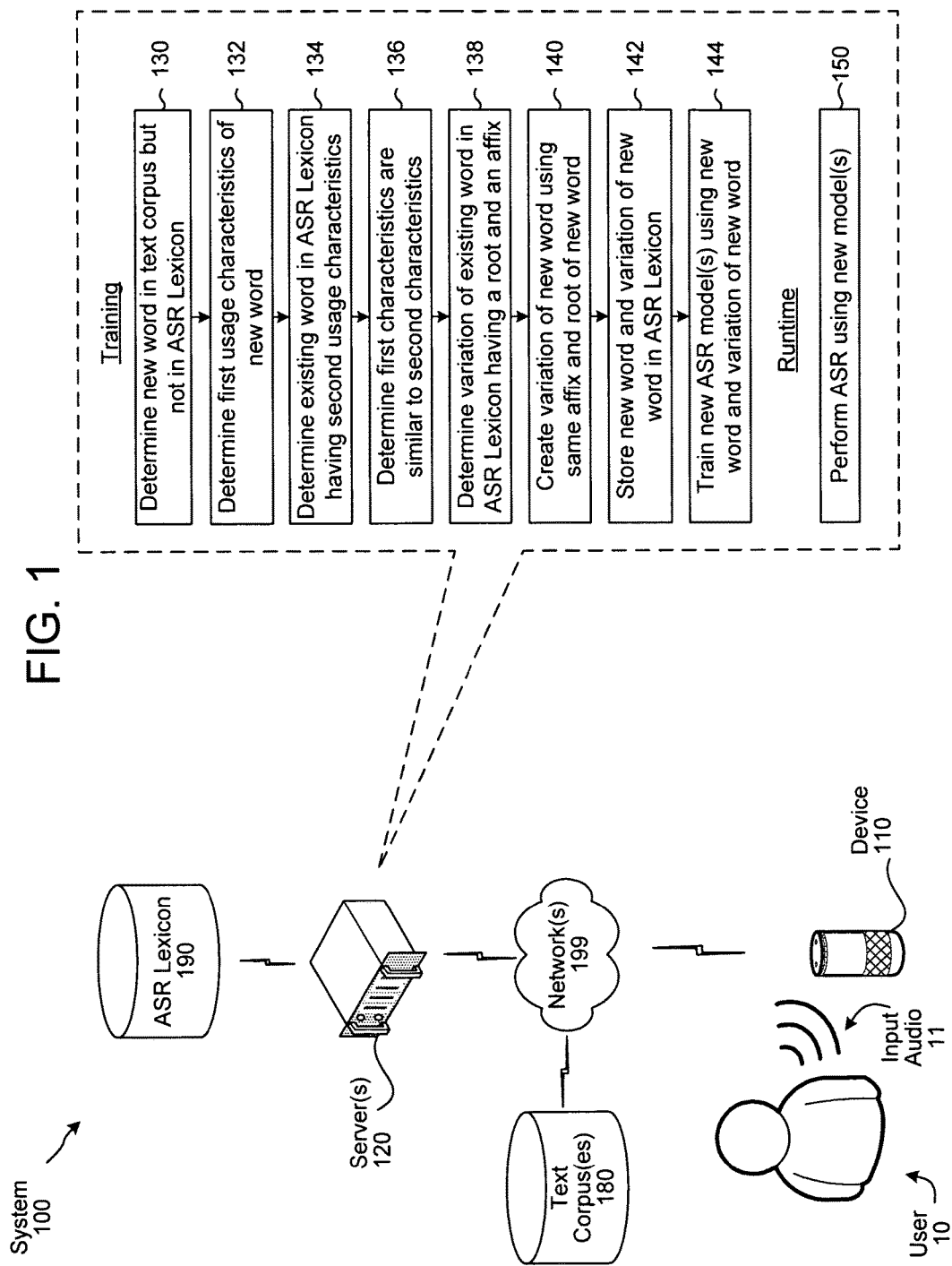
FIG. 1 illustrates a system for adding new recognizable words to an Automatic speech recognition (ASR) system according to embodiments of the present disclosure.

Offered is a flexible system and method for identifying new words, generating variations of those new words, and training an ASR system to recognize the new words and/or variations thereof. The system may use words having similar usages (i.e., words that are semantically or syntactically similar) to determine new word variations for ultimate recognition as part of ASR processing. FIG. 1 shows a system 100 configured to incorporate new words and/or variations thereof for ASR processing. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 may be capable of performing traditional speech processing (such as ASR and NLU) as described herein. A single server may be capable of performing all speech processing or multiple server(s) 120 may combine to perform the speech processing. Further, the server(s) 120 may be configured to execute certain commands, such as commands spoken by user 10. In addition, certain speech detection or command execution functions may be performed by device 110.

As shown in FIG. 1, during a training process the system, through server 120, may determine a determine (130) a new word in a text corpus 180 but not in an ASR lexicon 190. The ASR lexicon 190 is data representing all the words recognizable by the system 100 for purposes of ASR processing. The ASR lexicon 190 may include various data regarding recognizable words including spelling, pronunciation, associated graphemes (small language units), phonemes (small sound units), grapheme-to-phoneme relationships, or other data that may be used during ASR processing. The ASR lexicon 190 may be used to train individual models that are used during runtime to actually perform ASR processing. For present illustration, if a word is not in the ASR lexicon, the system 100 may not recognize the word in received speech during ASR processing.

To determine the new word, the system may use one or more text corpora 180. A text corpus is a data collection of text such as sentences, paragraphs, etc. A text corpus 180 may not be a single instance of text, but rather a collection of text that is accessible to the system 100. Examples of text corpora 180 include periodical archives, websites, books, book collections, encyclopedias, news service content, television or movie scripts, or any other source of text. The system may catalog or otherwise process the information of a text corpus to determine how words are used in the text corpus. Various data may be generated based on this processing and used to compare word usages with each other. An example using word vectors is discussed further below in reference to FIGS. 4A and 4B. So, using the information from a text corpus 180 (or other data source), the system may determine (132) first usage characteristics of the new word.

The system may then identify an existing word known to the system (i.e., within the ASR lexicon 190) that is used in a similar manner to the new word. This may be done as follows. The system may determine (134) an existing word in the ASR lexicon 190 where the existing word has second usage characteristics. The system may then determine (136) that the first characteristics are similar to the second characteristics. One example of this is to determine that a first vector associated with the first characteristics is sufficiently similar to a second vector associated with the second characteristics, as described below in reference to FIGS. 4A and 4B. If the first characteristics are sufficiently similar to the second characteristics, the system may determine that the new word is used similarly to the existing word. With this information, the system may determine potential variations of the new word based on the variations of the existing word.

As an example, take the words "lock" and "bolt." If an ASR lexicon 190 included one word but not the other (for example, the ASR lexicon included "lock" but not "bolt"), the system could determine using data about the text corpus 180, that the words are used similarly. (While the meanings of the two words may be similar in some circumstances and different in others, focusing on the usage of the word allows operation of the process with usage/syntax data, which may be easier for a system 100 to process than meaning data.) The system could also determine (either using data from the text corpus 180 and/or data from the ASR lexicon 190) that the known word lock had different variations such as "unlock" (with the root "lock" and the prefix "un"), "locker" (with the root "lock" and the suffix "er"), "locksmith" (a compound word with the root/word "lock" and the word "smith"), and the like. Thus the system could determine (138) a variation ("unlock") of the existing word ("lock"), where the variation has a root ("lock") and an affix ("un"). The system could then create (140) a variation ("unbolt") of the new word using the same affix ("un") and the root of the new word ("bolt"). The system can then store (142) the new word ("bolt") and/or the variation of the new word ("unbolt") in the ASR lexicon 190 and can train (144) a new ASR model(s) using the new word and the variation of the new word.

While the example new word used below ("bolt") is a root form of itself, if the new word is a different form (for example "unbolt" whose usage may be similar to "unlock") the system may determine that the new word includes a root form by determining that the known word ("unlock") which has a similar usage to the new word comprises a root form ("lock") plus additional letters ("un"). Thus the system could remove the additional letters from the new word ("unbolt") to identify the root form ("bolt"). The root form may then be used (as either itself as a variation of the new word) or to form other variations by combining the root with other words, affixes, or additional letters.

Many word variations may be determined by the system. For example, word variations may include a root form of a word, a hyphenated form of a word, a compound word where a second word is added to the new word (on either the beginning or end of the new word), an affix version of the new word where a prefix or suffix is added to the new word or to its root form, where an infix is added to form the new word (i.e., letters or word portions are inserted into a middle of a word) an adverb version of the new word (for example by adding "ly" to a root portion of the new word), a gerund form of the new word, a noun form of the new word, an adjective form of the new word, a plural form of the new word, a morphophonemic form (i.e., sound changes) of a word, a verb form of the new word, etc.

The ASR model(s) trained to recognize the new word and the variation of the new word may then be used at runtime. At runtime, a user 10 may speak an utterance including the new word/variation of the new word to a local device 110. The device 110 may receive the input audio 11 and convert the audio 11 to audio data 111. The local device 110 may then send the audio data 111 to the server 120 (which may be a different server from the one that trained the new ASR model(s)). The ASR processing server may then perform (150) ASR to recognize the new word and/or the variation of the new word.

As may be appreciated, the described techniques may be used to create variations of known words as well. For example, if the ASR lexicon 190 included the words "lock" and "bolt" and included variations of the word "lock" (e.g., "locksmith," "unlock," "locker," etc.) but no variations of the word "bolt," knowing the similarity between the usages of "lock" and "bolt," the system could create variations of the word "bolt" such as "bolter," "unbolt," etc.

As may also be appreciated, the described operations may result in variations of the new word being created that may not necessarily be frequently used words (or even recognized as independent words on their own). For example, again using the example of "lock" and "bolt," knowing the similarity between the usages of "lock" and "bolt," and the existence of the word "locksmith," the system may create a variation ("boltsmith") of the new word using the same affix from the variation of the existing word ("smith") and the root of the new word ("bolt"). "Boltsmith" may thus be incorporated into the ASR lexicon 190 and/or used to train a new ASR model(s) even if it isn't a "real" word, or a word likely to be used often. To address such problems, the system may track usage of newly added words over a period of time, and may retrain ASR model(s) (and adjust an ASR lexicon 190) to remove words or word variations added in the above manner that are not used.

Further, the new word-to-existing word relationship is not necessarily one-to-one. For example, new word "bolt" may also exhibit similar usage characteristics to existing word "run." And while certain variations of the existing word "run" ("runner," "running") may share word forms with existing word "lock" ("locker," "locking"), "run" may also have other variations (for example "runaway"). The system may thus create a variation of the new word "bolt" based on variations of both a first existing word ("lock") and a second existing word ("run"). Thus the system may create words that are a combination of the root of the new word and additional characters corresponding to variations of the first existing word ("lock") such as "bolter," "unbolt," and "boltsmith," but may also create words that are a combination of the root of the new word and additional characters corresponding to variations of the second existing word ("run") such as "boltaway."

The system can add many different variations of new words, even if those variations have not yet been identified in a text corpus. This may allow the system a certain flexibility to be able recognize new word variations when they begin to be spoken by users. Further, while the descriptions and illustrations herein using English as the language of the system, the techniques discussed may be used for ASR systems of many different languages.

Figure 2:
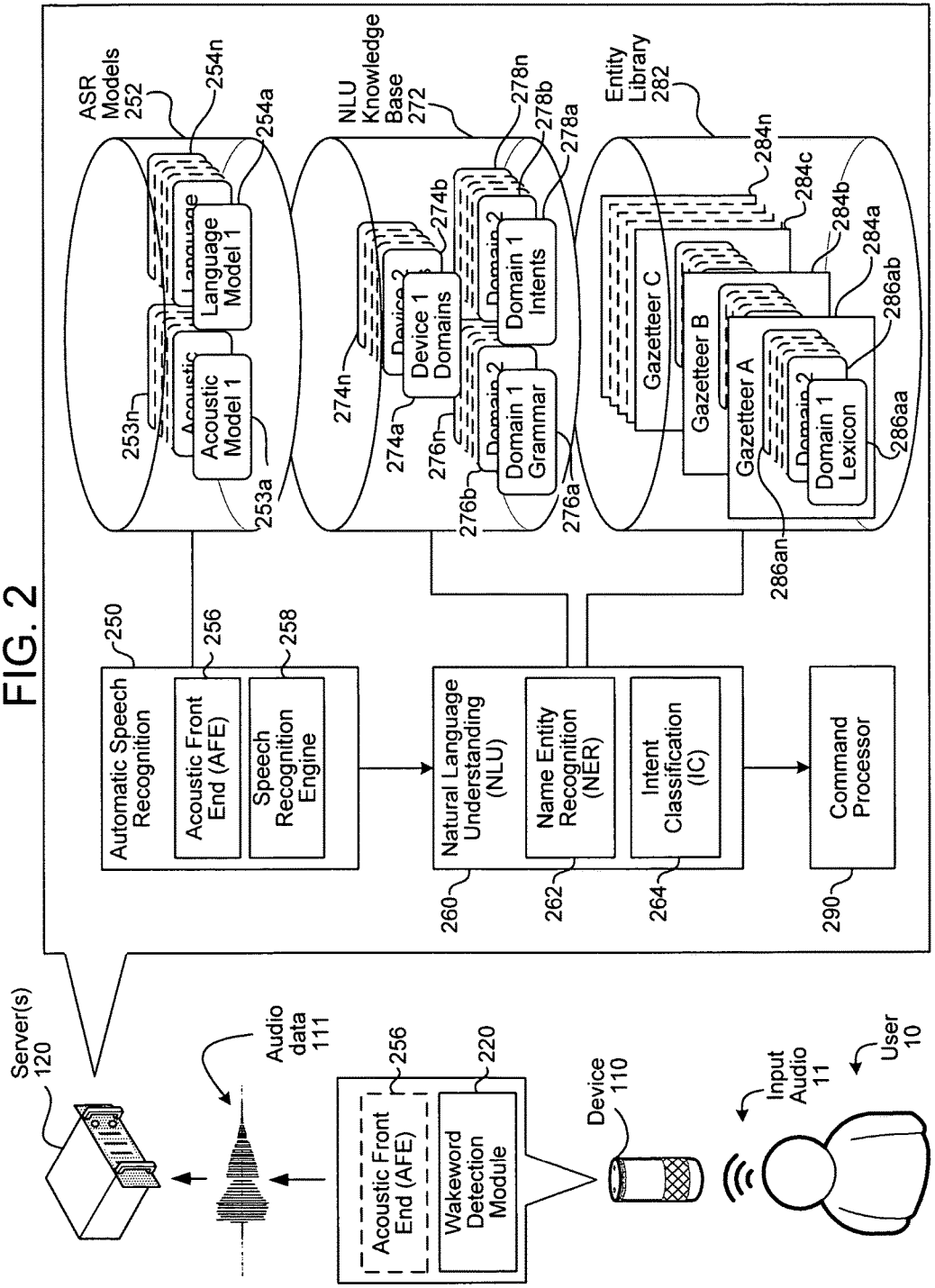
FIG. 2 is a conceptual diagram of speech processing according to embodiments of the present disclosure.

Further details of training ASR model(s) are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword. Alternatively, a system may be "always on," thus continually capturing audio data and processing the audio data through the speech system. Under a wakeword configuration, when a wakeword is detected the system may "wake" and commence further speech processing.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data. As discussed herein, as desired new ASR model(s) may be trained and activate to allow the system to recognize previously unrecognizable words. The ASR model(s) may be trained based on words store in an ASR lexicon 190.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain. For example, a music processing system may use certain models trained to recognize a set of words of an ASR lexicon 190 whereas a banking system may use other models trained to recognize a different set of words of the ASR lexicon 190. As may be appreciated, if an ASR model is not configured to recognize a particular word (such as a word that was not available in the ASR lexicon 190 at the time the ASR model was trained), the ASR system may not be able to include that particular word in a hypothesis.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "morn" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
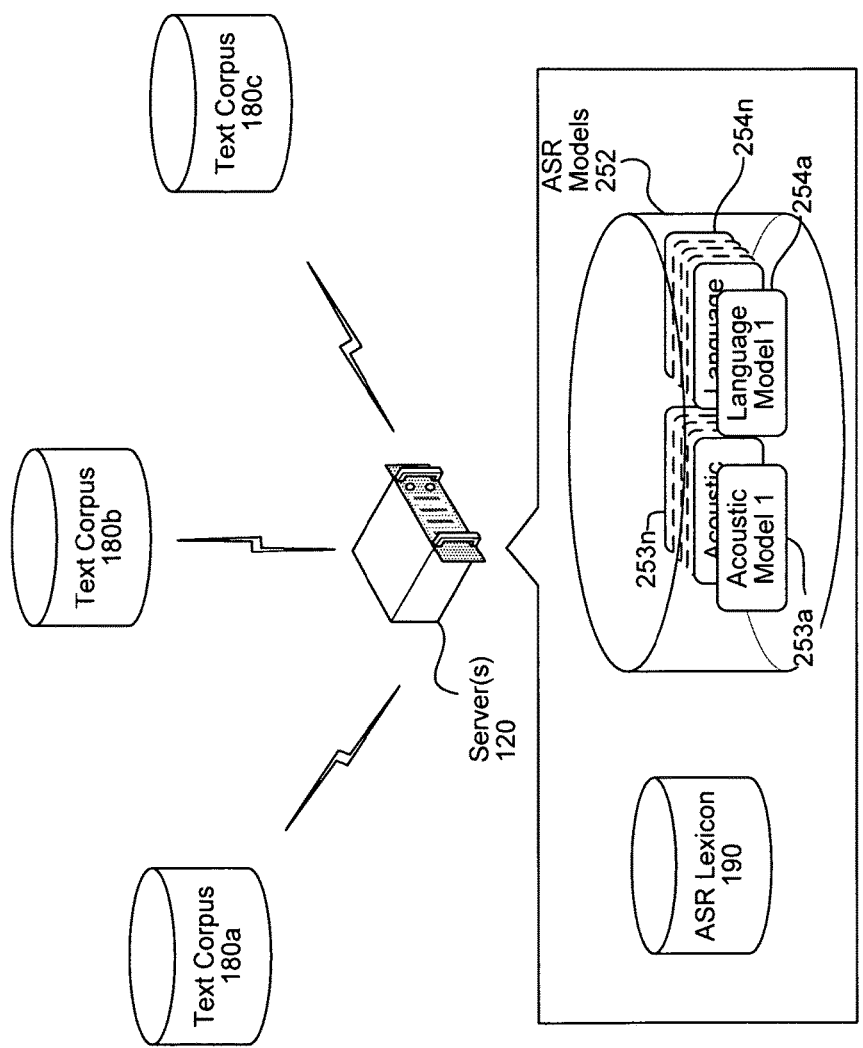
FIG. 3 illustrates incorporating new words into an ASR lexicon according to embodiments of the present disclosure.

As discussed above, to expand the ASR capabilities of a system, the system may be configured to identify and incorporate words not in its ASR lexicon 190. To do this, the system may access other sources of text, such as different text corpora 180, as illustrated in FIG. 3. The text corpora 180 may be any variety of text source. The text corpus 180 may be of general subject matter or may be specific to a domain (e.g., music, trivia, sports, politics, etc.) A domain specific text corpus may be useful in identifying new words that are specific to a domain of interest to the ASR system. For example, if the ASR system regularly processes commands in a music domain (and uses special music domain ASR models to do so) a music-associated text corpus may be useful in identifying new words in the music domain (for example, new band names, album titles, etc.). The system may identify and incorporate those words into an ASR lexicon 190 as described herein, and then may train music-domain ASR model(s) to recognize those new words.

Using the data from one or more text corpora 180, the system may analyze individual words and their respective usages. The usage characteristics for a particular word may be specific to a single text corpus 180 or may represent usage of the word as it appears over multiple text corpora 180. Usage characteristics corresponding to a word may be tracked and represented in a number of different ways. One way of representing word usage characteristics is with a data vector, where the data vector includes a number of characteristics representing how the word issued. For example, the vector may include characteristics indicating how often another word is used next to the subject word, how often the other word is used two words away from the subject word, etc. As can be appreciated, such vectors may become large, with thousands of characteristics resulting in thousands of data values (called dimensions) for each vector. The particular size of the vector may be configurable depending on the characteristics the system will evaluate when considering the usage of any particular word. Further, even with very large vectors, only certain dimensions of each vector may be evaluated when considering the usage of any particular word. With vectors available for each word of interest to the system (for example, all or some portion of the words in a text corpus 180, ASR lexicon 190, or the like) the usage characteristics (e.g., usage vectors) may be compared against each other to determine which usage characteristics/vectors are similar. Similar word usage characteristics/vectors may indicate similar usages between individual words.

The system may then map multiple vectors, each corresponding to the usage of a particular word, into a vector space. Given the number of dimensions for each vector, the vector space may be a high dimensional vector space. A number of known techniques for manipulating vectors in high dimensional (or other) vector space may be used to compare analyze vectors and compare vectors to each other. One example for representing and analyzing word usage characteristic as vectors is the GloVe: Global Vectors for Word Representation project by Jeffery Pennington, Richard Socher, and Christopher D. Manning of the Computer Science Department of Stanford University published in 2014, though other techniques may be used. Further, vectors are one example of tracking and comparing word usage characteristics, other techniques may be used.

Representing words in a vector space may be useful for showing the relationship between usage of individual words, as well as showing the relationship between usage of variations of a particular word and showing the relationship between the same usage variation across different word roots. Thus, a vector space may be used to represent semantic relationships between words as geometric relationship between vectors. For example, FIG. 4A illustrates a number of words in a hypothetical vector space where each point represents the vector location for the particular word.

Figure 4A:
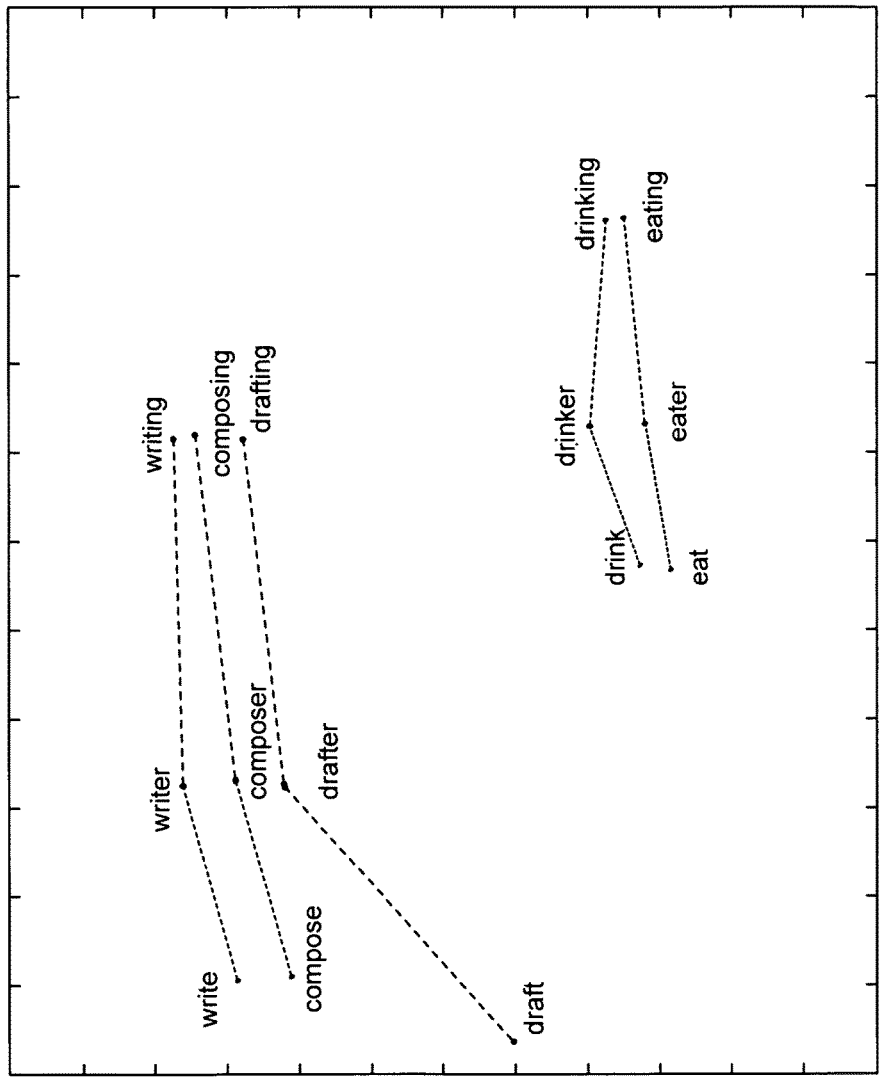

Although illustrated as located in a two-dimensional graph for discussion purposes, the usage vectors for the words illustrated in FIG. 4A would be in a high dimensional space. Further, FIG. 4A is shown for example purposes only and the vector locations/relationships do not necessarily reflect a true graphing of the usage of the illustrated words.

As illustrated in FIG. 4A, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 4A. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Words in the bottom corner of FIG. 4A exhibit similar relationships to each other as the words discussed above. The words "drink" and "eat" have different meanings, but similar usages as illustrated. Further, the usage relationships of "drink" to "drinker" to "drinking" are similar to the relationships of "eat" to "eater" to "eating." Also, "drink" shows a similar usage to "eat," "drinker" shows a similar usage to "eater" and "drinking" shows a similar usage to "eating." As "eat," "eater," and "eating" are all variations of a first word root, and "drink," "drinker," and "drinking" are all variations of a second word root, the system may use the usage relationships of these words to create new variations of another new word that shares usage with one of the variation forms. Thus, if a new word is found that is similar in usage to "eat" and/or "drink" the system may infer that the new word may have a variation of the form "x-er" or "x-ing" where x is the root of the new word. That is, if a vector corresponding to a new word is within a threshold distance to "eat" and/or "drink" the system may determine that the new word is used similarly to "eat" and/or "drink" and may create variations for the new word based on the variations of "eat" and/or "drink." Various known techniques such as using a Levenshtein distance may be used for comparing strings of words, which may be used to determine affixes (suffix, prefix, infix), vowel/letter changes, root forms, etc. Various known techniques, such as subtracting one vector from another, may be used for determining a difference between word usage, or word usage vectors.

Figure 4B:
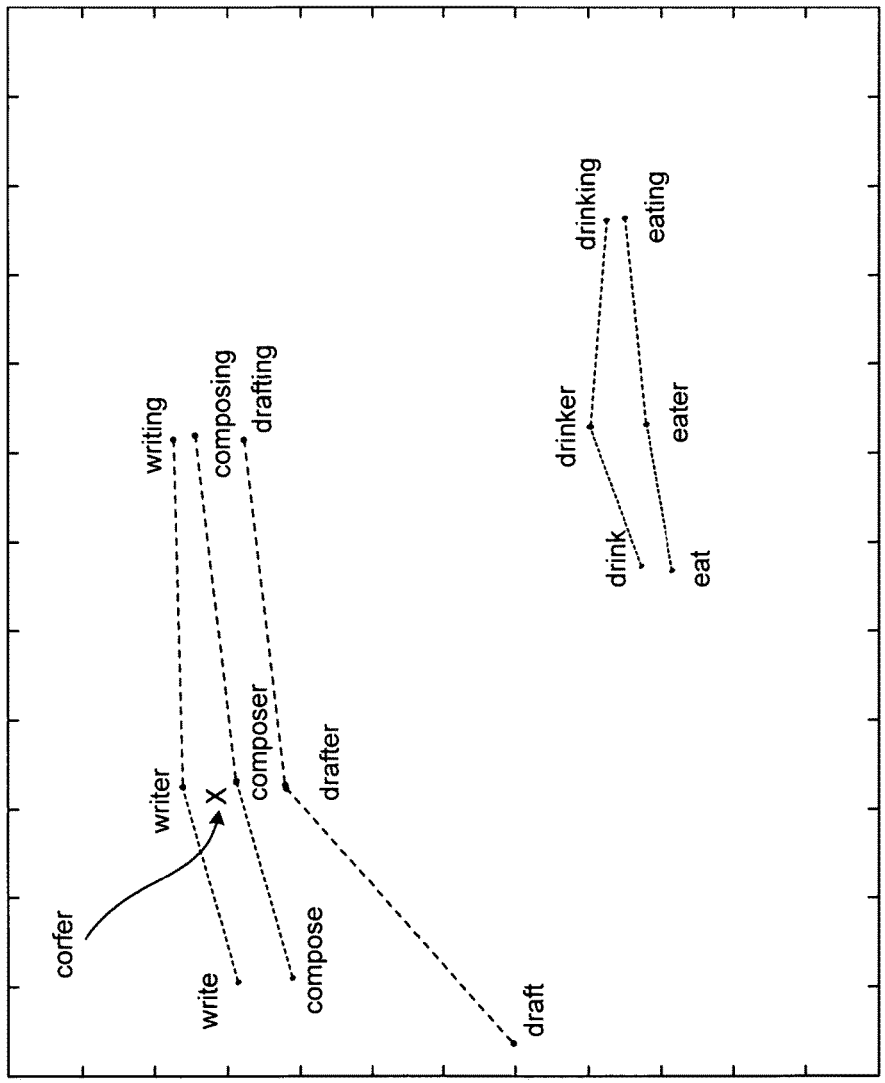

For example, assume a new word "corfer" is identified by the system in a text corpus 180. The system may also recognize that "corfer" is not included in the ASR lexicon 190. The system may have no understanding of the actual meaning of "corfer," however the system may use word usage as a proxy for meaning in order to incorporate "corfer" and/or variations of "corfer" into the ASR lexicon 190 and ultimately into ASR model(s). Thus, using the data from the text corpus 180, the system may determine how the word "corfer" is used, may then create a vector for the usage characteristics of "corfer" and compare that vector to vectors of other known words. For example, as shown in FIG. 4B, a vector for "corfer" may be located between "writer" and "composer" and nearby "drafter." While "corfer" may or may not have a similar meaning to "writer," "composer" and "drafter," the system may create word variations for "corfer" based on the word variations of "writer," "composer" and "drafter." For example, the system may recognize that "er" is a suffix of "writer," "composer" and "drafter," and thus may identify "corf" as the root of "corfer." The system may then use that root to create variations of "corfer" such as "corf" (the root itself), "corfing" (the root plus the suffix "ing" which appears in "writing," "composing," and "drafting") or others. Those variations may then be stored in the ASR lexicon 190 and incorporated into ASR model(s).

The process may also work with new variations of known words. For example, the word "scarfing" may appear in a text corpus 180, but not in the ASR lexicon 190. While "scarf" may be a known word, the variation "scarfing" may not be known. The system may determine usage characteristics for "scarfing" and compare those usage characteristics to the usage characteristics of known words. For example, as shown in FIG. 4C, "scarfing" may have similar usage to "drinking" and "eating." The system may recognize that "ing" is a suffix of "eating" and "drinking," and thus may identify "scarf" as the root of "scarfing." The system may then use that root to create variations of "scarfing" such as "scarfer" (the root plus the suffix "er" which appears in "eater" and "drinker"), "scarfable" (the root plus the suffix "able," which appears in "eatable" and "drinkable," not illustrated) or others. The system may not necessarily, in this example, create the root "scarf" as a new word as it may already exist in the ASR lexicon 190 in its noun form related to a winter accessory, which may also mean "scarf" has different usage characteristics than "drink" or "eat."

The system may use a variety of rules to generate derivations based on known word forms (x+s, x+ed, x+ing, etc.) but may only apply those rules where the specific forms are associated with the known word(s) having a similar usage to the new word, as described above. Various techniques or tools may be used to identify root forms, affix forms, compound forms, etc. of words. One example is gensim, an open-source Python module, but other techniques or tools may also be used. The variation of a word may be described as a morphological change. That is, a variation may include a change in the letter composition of a word along with a change in meaning of the word. For example, changing a singular to plural by adding an "s" suffix. A morphological change may involve at least one letter change, for example adding/changing an affix to a root of a word, inserting certain letter(s) from a word, clipping a word (e.g., removing letter(s) from a word, such as in creating an abbreviation), using a null affix (i.e., removing an affix), or other configurations where one or more letters are removed, inserted, or altered in a word. The new word created by the system may duplicate the morphological change or form of a variation of a first word using a second word to create the variation of the second word. The variation of the second word may then have a same morphological form as the variation of the first word.

In certain situations, a frequency of occurrence of a particular word variation may be determined prior to creating a variation of a new word. For example, in the example of "scarfing" discussed above, the system may determine that the variations of "drinker" and/or "eater" appear in a text corpus 180 a first number of times and that the variations of "drinkable" and "eatable" appear a second number of times. If the first number of times is above a frequency threshold, but the second number of times is not, the system may create the variation of "scarfer" but not "scarfable."

As another example, take the word "segway." The word segway (meaning the two-wheeled personal transportation device) may not be known to a particular ASR lexicon 190. But the word "bike" may be known to the ASR lexicon. The system may determine that "bike" and "segway" are used in a similar manner based on various usage data available to the system, for example if their respective usage vectors were within threshold distance of each other. The word "bike" may also have several known variations in the ASR lexicon such as "biker" (with the root "bik" and the suffix "er"), "biking" (with the root "bik" and the suffix "ing") or "bikes" (with the root "bik" and the suffix "es"). Other forms may include "motorbike," "bikerack," or the like. The system may determine that "biker" and "biking" appear most frequently, and with a frequency above a particular threshold. The system may then determine "segway" variations of "segwayer" and "segwaying" and may incorporate those words into the ASR lexicon 190.

Once a new word/variation is determined, the system may determine an expected pronunciation of that word so that an ASR model may ultimately recognize the word when the expected pronunciation is detected in speech at runtime. The system may determine known/predetermined pronunciations of any affix or additional letters of the new word from existing words in the ASR lexicon 190 that have the same affix/additional letters. The system may also determine a pronunciation of a root of a new word (or the entire new word) using a grapheme-to-phoneme process that determines relationships between letters and sounds. Other tools (such as receiving a user input of the pronunciation) or the like may also be used to determine an expected pronunciation of a new word or portion thereof. The resulting expected pronunciation may be stored in the ASR lexicon 190 and used to train an ASR model(s).

Figure 5:
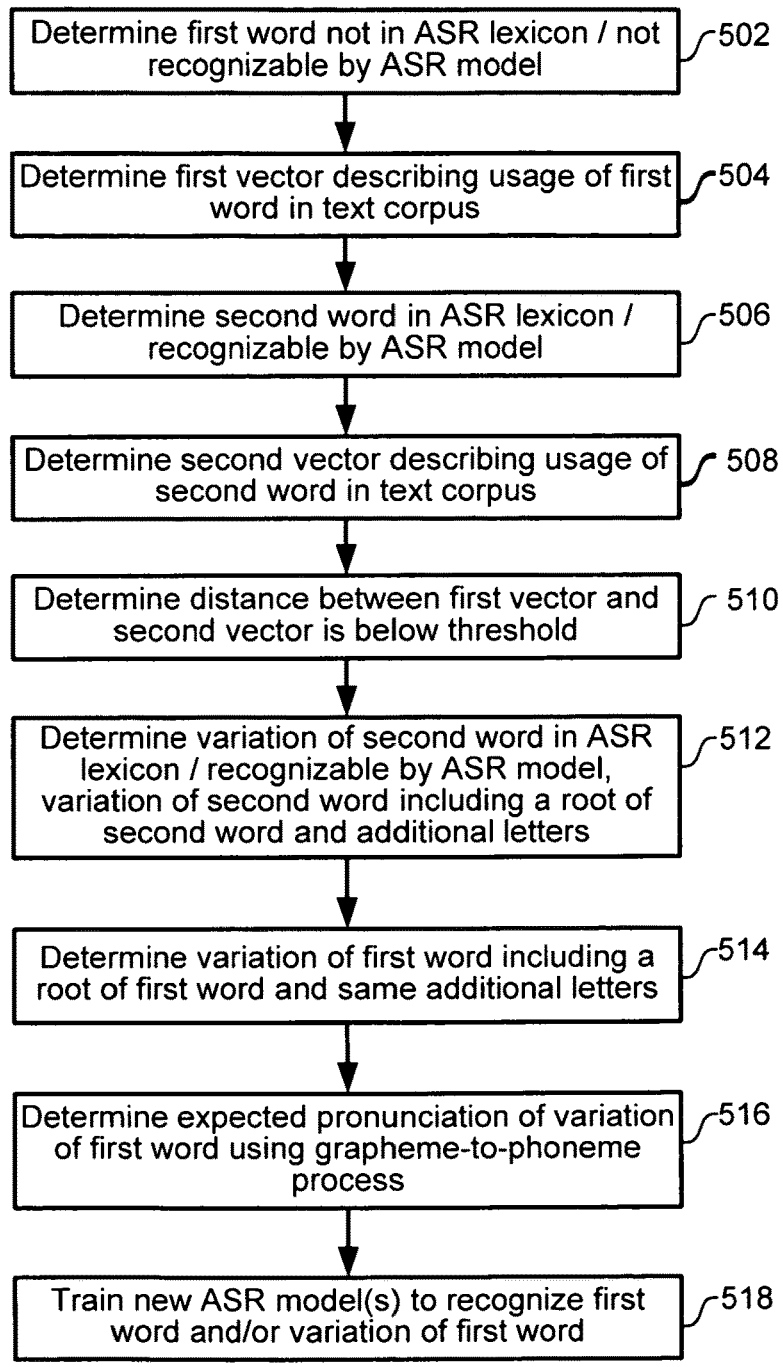
FIG. 5 is a block diagram conceptually illustrating adding new recognizable words to an automatic speech recognition (ASR) system according to embodiments of the present disclosure.

Thus, to determine and incorporate new words for ASR processing, a system may operate as illustrated in FIG. 5. The system may determine (502) a first word not in an ASR lexicon 190 and not recognizable by ASR model(s) of the system. The system may then determine (504) a first vector corresponding to usage characteristics of how the first word is used in a text corpus 180. The system may then determine (506) a second word that is in the ASR lexicon 190 and/or is recognizable by an ASR model(s) of the system. The system may then determine (508) a second vector corresponding to usage characteristics of how the second word is used in a text corpus 180, ASR lexicon 190 or otherwise. The system may then determine a distance in the vector space between the first vector and second vector and may determine (510) that the distance is below a threshold. The threshold may be configured in a number of different ways, including experimentally determined during a training time to configure a threshold that leads to desired system results. Different thresholds may be determined and used for different domains, purposes, etc. The system may then determine (512) a variation of the second word, where the variation of the second word is in the ASR lexicon 190 and includes a root of the second word and a plurality of additional letters. Alternatively, the variation may be any other variation type as discussed herein. The system may then determine (514) a variation of the first word, where the variation of the first word includes a root of the first word and the same plurality of additional letters. The system may then determine (516) an expected pronunciation of the variation of the first word using a grapheme-to-phoneme process and may then train (518) a new ASR model(s) to recognize the first word and/or the variation of the first word.

Once the ASR model(s) is trained, it may be deployed to an ASR server 120 or other device for operation during runtime. During runtime, audio data is received by a device and processed by a speech recognition engine 258 using the trained ASR model(s). Thus, during runtime a device may use a trained ASR model to process audio data and output ASR results including a new word and/or new word variation.

After an ASR model(s) that is trained to recognize a new word in this manner is deployed, the system may track how often the new word/variation is recognized over a period of time. For example, a server 120 or other device actually performing the ASR processing may track how often the new word is recognized. The server 120 may then send data regarding how often the new word is recognized to another device, which may receive such data from multiple ASR processing devices. The data collection device (which may also be a server 120 or some other device) may determine if the new word has been recognized over a threshold number of times over the time period. If it has, the system may determine that the new word/variation is useful and may continue use of the ASR model(s) trained to recognize the new word. If, however, the new word was not recognized over the threshold number of times the system may determine that the new word should be removed from the ASR lexicon 190 and/or ASR model(s) and may train another new ASR model(s) that does not have the new word/variation in it. Of course, certain variations may be used often while others are not. For example, if an ASR model(s) is trained to recognize a new word and a variation of the first word, the new word may be recognized over the threshold number of times but the variation may not be. In which case the system may train another new ASR model(s) to recognize the new word but not the variation.

While the system may be configured to operate in an automated matter as described above, in certain aspects, a human lexicographer or other operator may curate or otherwise approve new words before they are included in the ASR lexicon 190 and/or ASR model(s). In this manner certain word variations that may not ultimately ever be used may be prevented from entering the ASR lexicon 190. Human intervention is not necessary, however, as other fallbacks, such as removing a word from the ASR lexicon 190 and/or ASR model(s) due to lack of use, may prevent unnecessary words from using computing resources.

Figure 6:
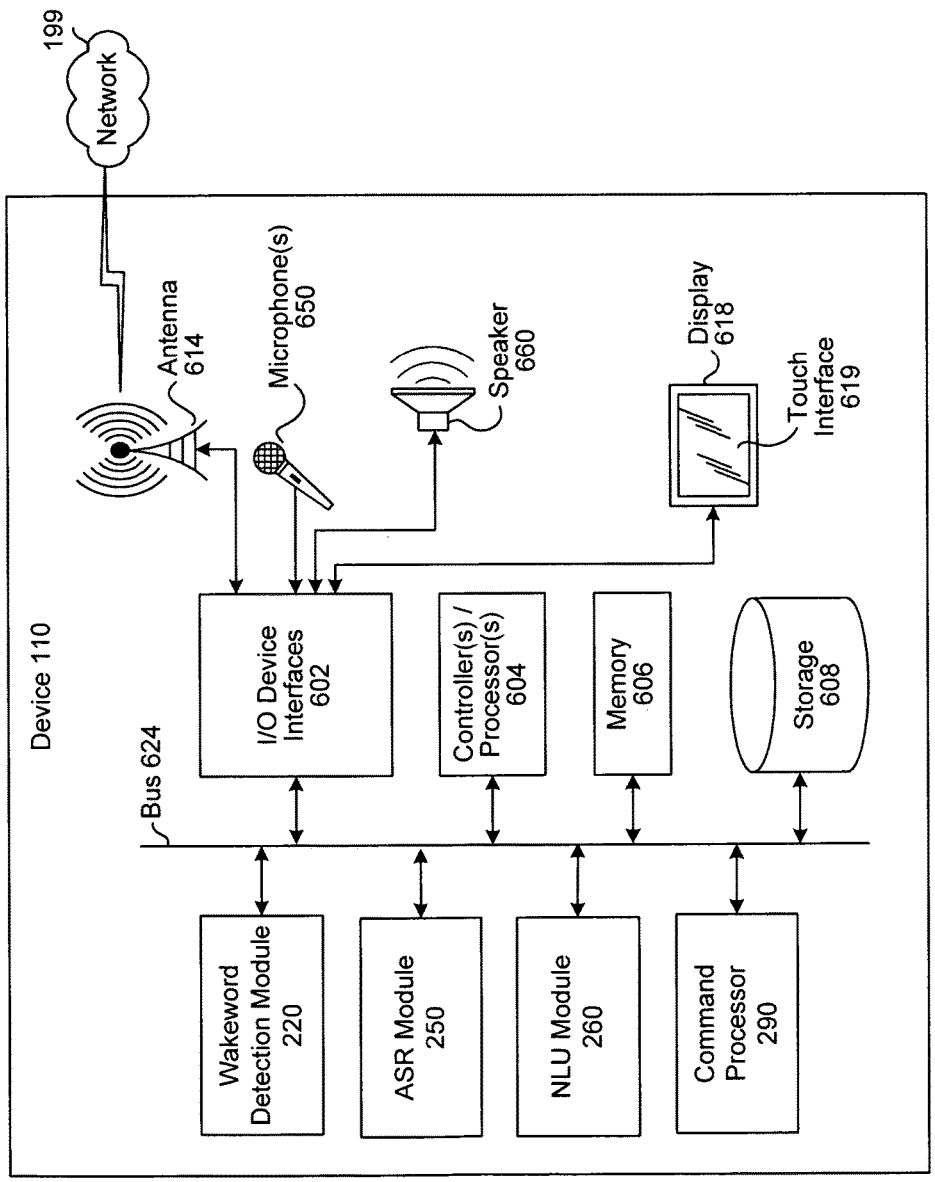
FIG. 6 is a block diagram conceptually illustrating example components of a device according to embodiments of the present disclosure.
Figure 7:
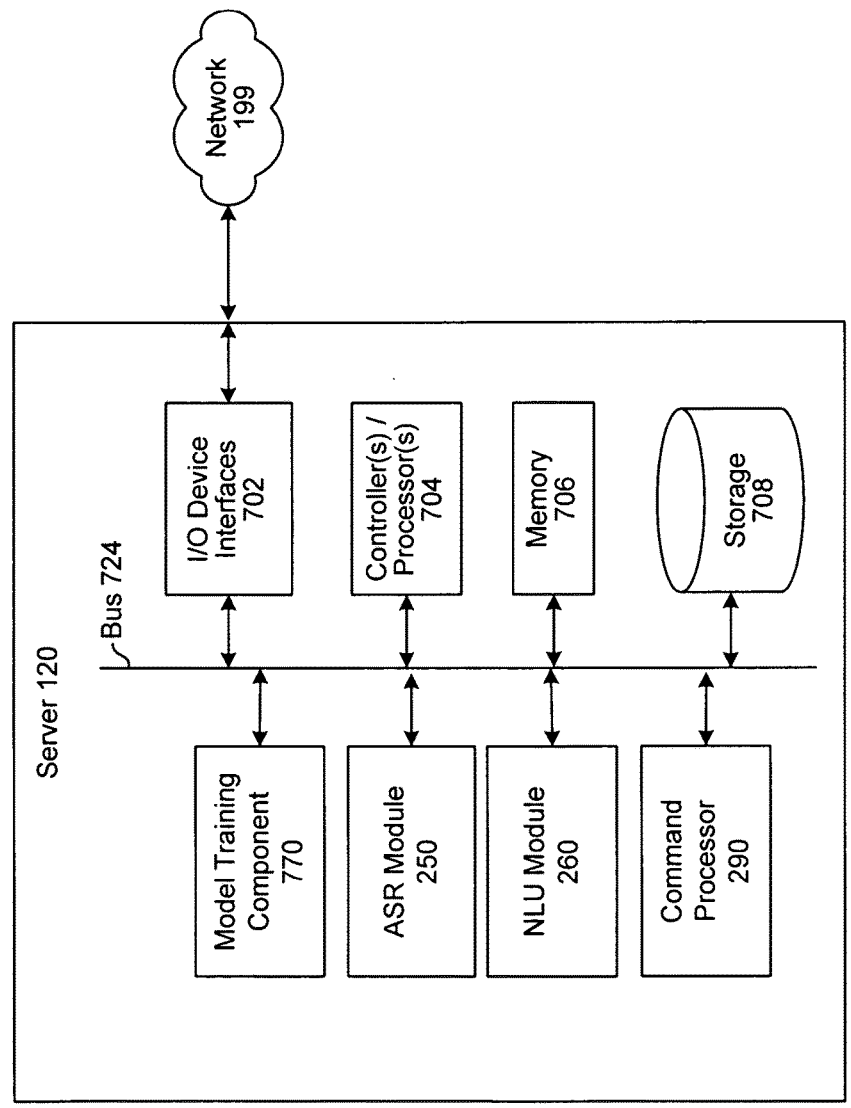
FIG. 7 is a block diagram conceptually illustrating example components of a server according to embodiments of the present disclosure.

FIG. 6 is a block diagram conceptually illustrating a local device 110 that may be used with the described system. FIG. 7 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (604/704), that may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive (MRAM) and/or other types of memory. Each device may also include a data storage component (608/708), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces, as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to the device 110 of FIG. 6, the device 110 may include a display 618, which may comprise a touch interface 619. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 602 that connect to a variety of components such as an audio output component such as a speaker 660, a wired headset or a wireless headset (not illustrated) or other component capable of outputting audio. The device 110 may also include an audio capture component. The audio capture component may be, for example, a microphone 650 or array of microphones, a wired headset or a wireless headset (not illustrated), etc. The microphone 650 may be configured to capture audio. If an array of microphones is included, approximate distance to a sound's point of origin may be performed acoustic localization based on time and amplitude differences between sounds captured by different microphones of the array. The device 110 (using microphone 650, wakeword detection module 220, ASR module 250, etc.) may be configured to determine audio data corresponding to detected audio data. The device 110 (using input/output device interfaces 602, antenna 614, etc.) may also be configured to transmit the audio data to server 120 for further processing or to process the data using internal components such as a wakeword detection module 220.

For example, via the antenna(s), the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 608 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 608 and compare the captured audio to the stored models and audio sequences using audio comparison, pattern recognition, keyword spotting, audio signature, and/or other audio processing techniques.

The server may include a model training component 770. The model training component may be used to train ASR model(s) to incorporate new words as described above. Various machine learning techniques may be used to perform various steps described above, such as training an ASR model, performing ASR, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used during training to, for example, train machine learning model(s) to be used by an NLU router 280, train application specific NLU model(s) to be used by an NLU engine XXM20, or the like.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 6 and 7, are exemplary, and may be located a stand-alone device or may be included, in whole or in part, as a component of a larger device or system.

Figure 8:
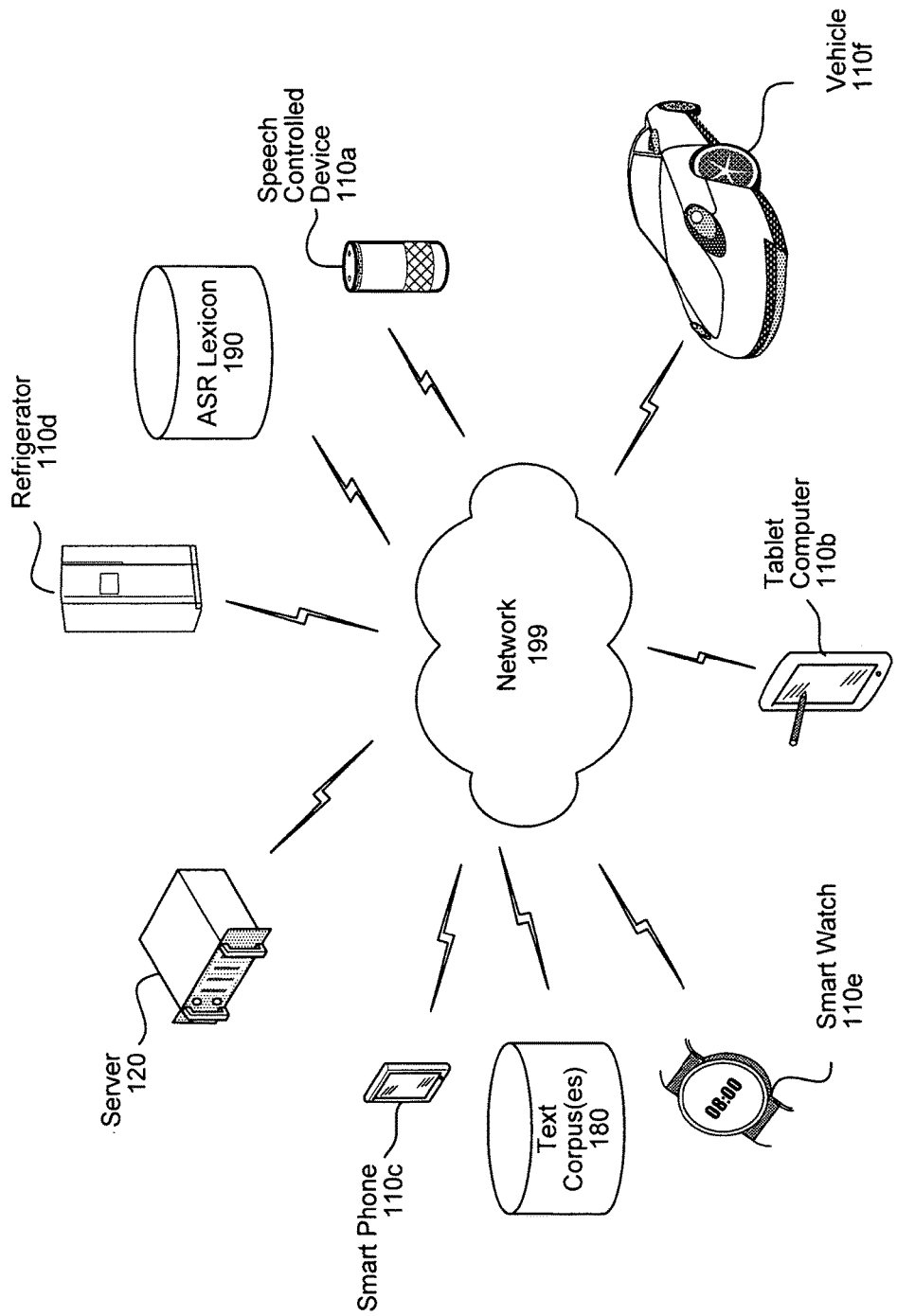
FIG. 8 illustrates an example of a computer network for use with the system.

As illustrated in FIG. 8 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 650 or audio capture devices, with processing performed by ASR, NLU, or other components of the same device or another device connected via network 199, such as an ASR 250, NLU 260, etc. of one or more servers 120. The system may also include an ASR lexicon 190, which may be stored local to an ASR model training server 120. The system may also include (or be able to access) text corpus(es) 180 which may be located proximate to or separate from an ASR model training server 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for configuring a speech recognition system to recognize a new word, the method comprising:
 identifying a first speech recognition model;
 determining a first word, wherein the first speech recognition model is not configured to recognize the first word;
 determining first characteristics corresponding to how the first word is used;
 determining second characteristics corresponding to how a second word is used;
 determining that the first characteristics are similar to the second characteristics;
 determining a variation of the second word, wherein the variation of the second word is a combination of a root of the second word and a first affix;
 determining that the first speech recognition model is configured to recognize both the second word and the variation of the second word;
 determining, based at least in part on determining that the first characteristics are similar to the second characteristics and based at least in part on determining that the first speech recognition model is configured to recognize both the second word and the variation of the second word, a variation of the first word, wherein the variation of the first word is a combination of a root of the first word and the first affix; and
 training a second speech recognition model to recognize the first word and the variation of the first word.

2. The computer-implemented method of claim 1, further comprising determining a training corpus comprising usage examples of a plurality of words, the plurality including the first word, the second word and the variation of the second word, and wherein:
 determining the first characteristics comprises determining a first vector representing usage of the first word in the training corpus;
 determining the second characteristics comprises determining a second vector representing usage of the second word in the training corpus; and
 determining that the first characteristics are similar to the second characteristics comprises determining that the first vector is within a threshold distance of the second vector.

3. The computer-implemented method of claim 1, further comprising:
 determining third characteristics corresponding to how a third word is used;
 determining that the first characteristics are similar to the third characteristics;
 determining a variation of the third word, wherein the variation of the third word is a combination of a root of the third word and a second affix;
 determining that the first speech recognition model is configured to recognize both the third word and the variation of the third word;
 determining a second variation of the first word, wherein the second variation of the first word is a combination of a root of the first word and the second affix; and
 training the second speech recognition model to further recognize the second variation of the first word.

4. The computer-implemented method of claim 1, further comprising:
 receiving, from a first device, data corresponding to use, by the first device, of the second speech recognition model;
 determining, using the data, that the variation of the first word was recognized less than a threshold number of times over a time period; and
 training a third speech recognition model to recognize the first word but not the variation of the first word.

5. A computer-implemented method comprising:
 determining a speech recognition model, wherein the speech recognition model was trained by:
  determining first characteristics corresponding to a first word,
  determining second characteristics corresponding to a second word,
  determining that the first characteristics are similar to the second characteristics,
  identifying, in a lexicon, a variation of the second word, wherein the variation of the second word differs from the second word by at least one letter,
  creating, based at least in part on determining that the first characteristics are similar to the second characteristics and based at least in part on identifying the variation of the second word, a variation of the first word, wherein the variation of the first word differs from the first word by the at least one letter, and
  training the speech recognition model to recognize the first word and the variation of the first word; and
 performing speech recognition using the speech recognition model to determine speech recognition output including the variation of the first word.

6. The computer-implemented method of claim 5, wherein the at least one letter comprises an affix.

7. The computer-implemented method of claim 5, wherein the at least one letter comprises a third word and the variation of the second word is a compound word.

8. The computer-implemented method of claim 5, wherein the speech recognition model was further trained by determining a pronunciation of the variation of the first word using a grapheme-to-phoneme process, a predetermined pronunciation of the root of the first word, and a predetermined pronunciation of the additional plurality of letters.

9. The computer-implemented method of claim 5, wherein the speech recognition model was further trained by determining a training corpus comprising usage examples of a plurality of words, the plurality including the first word, the second word and the variation of the second word, and wherein:
 determining the first characteristics comprises determining a first vector representing usage of the first word in the training corpus,
 determining the second characteristics comprises determining a second vector representing usage of the second word in the training corpus, and
 determining that the first characteristics are similar to the second characteristics comprises determining that the first vector is within a threshold distance of the second vector.

10. The computer-implemented method of claim 9, wherein the speech recognition model was trained to recognize a subset of the plurality of words.

11. The computer-implemented method of claim 9, wherein the speech recognition model was further trained by:
 determining a third vector representing usage of the variation of the second word in the training corpus;

determining a fourth vector representing usage of a second variation of the second word in the training corpus, the second variation of the second word comprising the root of the second word and a second at least one letter;

determining a root of the second word using the third vector, fourth vector, variation of the second word and second variation of the second word; and isolating the at least one letter used to create the variation of the first word using the variation of the second word and the root of the second word.

12. The computer-implemented method of claim 5, further comprising:

determining data corresponding to use of the speech recognition model over a time period;

sending the data to a second device;

receiving a second speech recognition model configured to recognize the first word but not the variation of the first word; and performing speech recognition using the second speech recognition model.

13. A computing system comprising:

at least one processor;

a memory including instructions operable to be executed by the at least one processor to cause the system to perform:

determining a speech recognition model, wherein the speech recognition model was trained by:

determining first characteristics corresponding to a first word, determining second characteristics corresponding to a second word, determining that the first characteristics are similar to the second characteristics, identifying, in a lexicon, a variation of the second word, wherein the variation of the second word differs from the second word by at least one letter, creating, based at least in part on determining that the first characteristics are similar to the second characteristics and based at least in part on identifying the variation of the second word, a variation of the first word, wherein the variation of the first word differs from the first word by the at least one letter, and training the speech recognition model to recognize the first word and the variation of the first word; and performing speech recognition using the speech recognition model to determine speech recognition output including the variation of the first word.

14. The computing system of claim 13, wherein the least one letter comprises an affix.

15. The computing system of claim 13, wherein the at least one letter comprises a third word and the variation of the second word is a compound word.

16. The computing system of claim 13, wherein the speech recognition model was further trained by determining a pronunciation of the variation of the first word using a grapheme-to-phoneme process, a predetermined pronunciation of the root of the first word, and a predetermined pronunciation of the additional plurality of letters.

17. The computing system of claim 13, wherein the speech recognition model was further trained by determining a training corpus comprising usage examples of a plurality of words, the plurality including the first word, the second word and the variation of the second word, and wherein:

determining the first characteristics comprises determining a first vector representing usage of the first word in the training corpus, determining the second characteristics comprises determining a second vector representing usage of the second word in the training corpus, and determining that the first characteristics are similar to the second characteristics comprises determining that the first vector is within a threshold distance of the second vector.

18. The computing system of claim 17, wherein the speech recognition model was trained to recognize a subset of the plurality of words.

19. The computing system of claim 17, wherein the speech recognition model was further trained by:

determining a third vector representing usage of the variation of the second word in the training corpus;

determining a fourth vector representing usage of a second variation of the second word in the training corpus, the second variation of the second word comprising the root of the second word and a second at least one letter;

determining a root of the second word using the third vector, fourth vector, variation of the second word and second variation of the second word; and isolating the at least one letter used to create the variation of the first word using the variation of the second word and the root of the second word.

20. The computing system of claim 13, wherein the instructions are operable to be executed by the at least one processor to further cause the system to perform:

determining data corresponding to use of the speech recognition model over a time period;

sending the data to a second device;

receiving a second speech recognition model configured to recognize the first word but not the variation of the first word; and performing speech recognition using the second speech recognition model.

* * * * *